(12) United States Patent
Mitsuzumi (10) Patent No.: US 9,432,194 B2
(45) Date of Patent: Aug. 30, 2016

(54) RECORDING MEDIUM WITH AUTHENTICATION AND ENCRYPTION/DECRYPTION FUNCTIONS

(71) Applicant: PANASONIC CORPORATION, Osaka (JP)

(72) Inventor: Masanori Mitsuzumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/193,648

(22) Filed: Feb. 28, 2014

(65) Prior Publication Data
US 2014/0281552 A1 Sep. 18, 2014

(30) Foreign Application Priority Data

Mar. 15, 2013 (JP) ................................. 2013-052848
Dec. 17, 2013 (JP) ................................. 2013-259755

(51) Int. Cl.
| H04L 29/06 | (2006.01) |
| H04L 9/32 | (2006.01) |
| G06F 21/31 | (2013.01) |
| G06F 21/79 | (2013.01) |

(52) U.S. Cl.
CPC ............ *H04L 9/3234* (2013.01); *G06F 21/31* (2013.01); *G06F 21/79* (2013.01); *H04L 9/3226* (2013.01); *G06F 2221/2107* (2013.01)

(58) Field of Classification Search
CPC ........................... H04L 9/3226; H04L 9/3234
See application file for complete search history.

(56) References Cited

U.S. PATENT DOCUMENTS 6,282,624 B1 * 8/2001 Kimura et al. ................ 711/202
6,336,585 B1 * 1/2002 Harada .......................... 235/380

(Continued)

FOREIGN PATENT DOCUMENTS

| JP | 2001-320668 A | 11/2001 |
| JP | 2003-076611 A | 3/2003 |

(Continued)

OTHER PUBLICATIONS

Yang, Jan-Ti; Shieh, Sheng-Zhong; Yu, Jun-Ming; Lee, Ren-Hsio; "Optimized Structure for Fast Data Storage to Non-Volatile Memory with Minimum Chip Size", 7th International Conference on Signal Processing, Aug. 31-Sep. 4, 2004, IEEE, vol. 3, pp. 2473-2476.*

(Continued)

*Primary Examiner* — Victor Lesniewski
(74) *Attorney, Agent, or Firm* — McDermott Will & Emery LLP (57) ABSTRACT

A recording medium includes an encryption/decryption control unit, an authentication control unit, a non-volatile memory, and a volatile memory. The volatile memory stores recorded-position information of data recorded in a data recording area of the non-volatile memory under an unauthenticated condition that an authentication procedure by the authentication control unit has not been performed. The recorded-position information stored in the volatile memory is erased by stopping power supply by detaching the recording medium from the apparatus body, and becomes unavailable in the recording medium even if the power is supplied again to the recording medium so that the data recorded in the data recording area under the unauthenticated condition is not read out.

3 Claims, 5 Drawing Sheets

(56) References Cited

U.S. PATENT DOCUMENTS

| | | | |
|---|---|---|---|
| 6,606,707 B1* | 8/2003 | Hirota et al. | 713/172 |
| 7,469,837 B2* | 12/2008 | Mizushima | 235/492 |
| 8,037,269 B2* | 10/2011 | Okamoto et al. | 711/163 |
| 8,533,856 B2* | 9/2013 | Estakhri et al. | 726/28 |
| 2002/0039479 A1* | 4/2002 | Watanabe | H04N 1/00127 386/230 |
| 2003/0231249 A1* | 12/2003 | Nakamura | 348/231.99 |
| 2004/0059916 A1* | 3/2004 | Mizushima et al. | 713/172 |
| 2004/0199784 A1* | 10/2004 | Irisawa | G06F 21/31 726/26 |
| 2005/0060495 A1 | 3/2005 | Pistoulet | |
| 2005/0185067 A1* | 8/2005 | Estakhri et al. | 348/231.9 |
| 2005/0216651 A1* | 9/2005 | Tanabiki | G06F 12/1441 711/100 |
| 2007/0113278 A1* | 5/2007 | Maeda | G06F 3/0607 726/20 |
| 2008/0178265 A1* | 7/2008 | Tsuchiya et al. | 726/3 |
| 2009/0296937 A1* | 12/2009 | Suu et al. | 380/277 |
| 2010/0332692 A1* | 12/2010 | Nakajima | H04N 1/00127 710/19 |
| 2011/0088084 A1* | 4/2011 | Yasaki | G06F 21/6218 726/5 |
| 2012/0179858 A1* | 7/2012 | Miyashita | G11C 7/24 711/103 |

FOREIGN PATENT DOCUMENTS

| | | |
|---|---|---|
| JP | 2004-030600 A | 1/2004 |
| JP | 2005-071380 A | 3/2005 |
| JP | 2008-524755 A | 7/2008 |
| WO | 96/27155 A2 | 9/1996 |
| WO | 96/27155 A3 | 6/1997 |
| WO | 2006-069274 A2 | 6/2006 |

OTHER PUBLICATIONS

Koh, Wei; "Digital Memory Card Market and Technology", Conference on High Density Microsystem Design and Packaging and Component Failure Analysis, Jun. 27-29, 2005, IEEE, 5 pages.*

* cited by examiner

RECORDING MEDIUM WITH AUTHENTICATION AND ENCRYPTION/DECRYPTION FUNCTIONS

RELATED APPLICATIONS

This application claim the benefit of Japanese Application No. 2013-052848, filed on Mar. 15, 2013 and Japanese Application No. 2013-259755, filed Dec. 17, 2013, the disclosures of which Applications are incorporated by reference herein.

BACKGROUND OF THE INVENTION

1. Field of the Invention

The present technique relates to a recording medium having a security function and used in a photographing apparatus, for example.

2. Description of the Related Art

Conventionally, such a recording medium has been realized that can encrypt and store image data captured by a photographing apparatus. To realize encryption, an encryption key is required to encrypt plane text data. Also, a decryption key is required to decode the encrypted data. In some encryption systems, the same key is used as both the encryption key and the decryption key. One or both of the encryption key and the decryption key must be managed securely so as not to be leaked to a third party.

As means for securely keeping these key data, such an IC card is considered potent that is designed to make it difficult to decode the stored data on software and on hardware. For example, Unexamined Japanese Patent Publication No. 2001-320668 discloses a photographing apparatus which stores key data confidentially in a storage device such as an IC card, and encrypts digital data with the stored key.

Further, such a recording medium having a security function is known that makes it possible, when an authentication procedure has not been completed, to select either a mode in which the captured image data are not encrypted and stored or a mode in which the captured image data are encrypted and stored.

On the other hand, in the business-use photographing apparatus used for news reporting or the like, such an instantaneous operation is required that can start shooting immediately after power-on. However, the recording medium having a security function cannot execute the encryption-recording operation, nor confirm the recorded encrypted contents data, before completing authentication. Therefore, it was difficult for the recording medium having a security function used in the business-use photographing apparatus to balance the instantaneous operation to allow quick start of shooting after power-on with the operation to secure the confidentiality of the recorded data.

SUMMARY OF THE INVENTION

A recording medium according to the present technique is attachable to and detachable from an apparatus body, and is supplied with power from the apparatus body when it is attached to the apparatus body. This recording medium includes: an encryption/decryption control unit that performs encryption and decryption of data transmitted from the apparatus body; an authentication control unit that performs an authentication procedure for authentication a password sent from the apparatus body; a non-volatile memory that stores an encryption key to be used in the encryption/decryption control unit and the authentication password to be used for authentication in the authentication control unit, and has a data recording area for recording data encrypted by the encryption/decryption control unit; and a volatile memory for storing recorded-position information of data recorded in the data recording area of the non-volatile memory under an unauthenticated condition in which the authentication procedure by the authentication control unit has not been performed.

DETAILED DESCRIPTION OF THE PREFERRED EMBODIMENT

A recording medium having a security function according to an embodiment of the present technique will hereinafter be described with reference to the drawings. However, unnecessarily detailed description may occasionally be omitted. For example, detailed description of well-known matters and redundant description of substantially the same configurations may occasionally be omitted. This is to avoid the following description from becoming unnecessarily redundant, and to ease understanding of those skilled in the art.

Incidentally, the inventor intends to provide the following description and the accompanying drawings to allow any person skilled in the art to fully understand the present technique, and does not intend to limit the subject matter defined in the claims by the following description.

The recording medium according to the present technique is used in a photographing apparatus. A schematic configuration of a business-use photographing apparatus will hereinafter be described.

Figure 1:
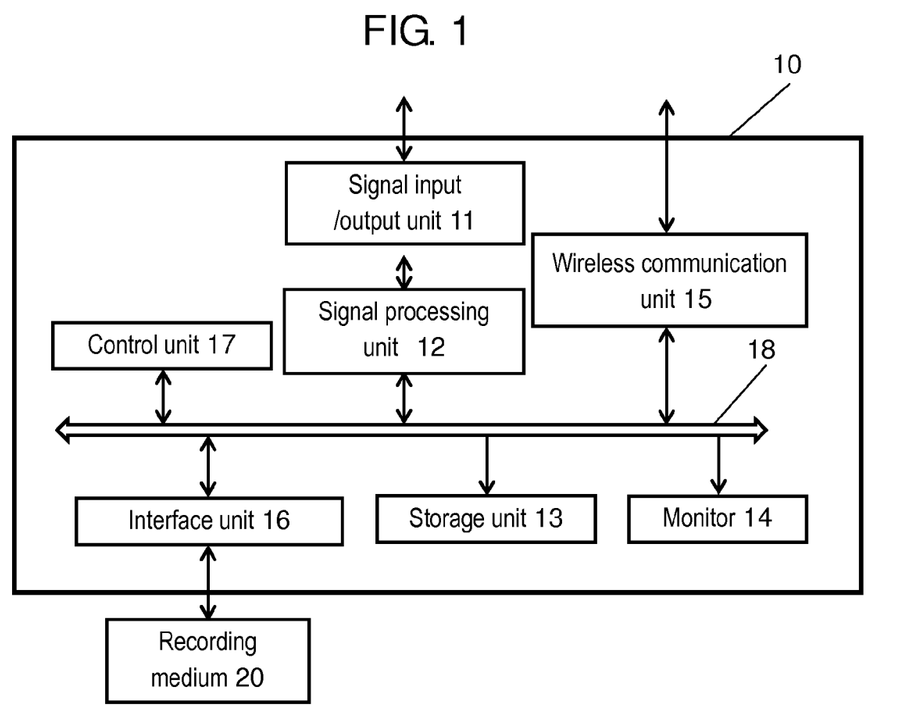
FIG. 1 is a block diagram showing a schematic configuration of a photographing apparatus using a recording medium according to the present technique.

FIG. 1 is a block diagram showing a schematic configuration of a photographing apparatus using a recording medium according to the present technique.

As shown in FIG. 1, apparatus body 10 of a photographing apparatus has: signal input/output unit 11 for inputting and outputting a video signal and an audio signal; signal processing unit 12 that performs signal processing including analog to digital conversion of the video signal and the audio signal and conversion of the video and audio signals to signals in specified signal formats; storage unit 13 such as a flash memory; monitor 14 such as a liquid crystal display; wireless communication unit 15 that performs wireless data transmission to and reception from external equipment; interface unit 16 that performs data transmission and reception between apparatus body 10 and recording medium 20; and control unit 17 that controls each of these components.

The components in apparatus body 10 perform data transmission and reception via bus 18.

Further, apparatus body 10 is provided with an adapter (not shown in the figure) with which a user can arbitrarily attach and detach recording medium 20. The adapter is connected to interface unit 16. Recording medium 20 is supplied with power by being attached to the adapter of apparatus body 10. This allows recording medium 20 to execute an encryption-recording of data produced by apparatus body 10 and an operation to decode and read out the encryption-recorded data.

Signal input/output unit 11 has functions of inputting a video signal and an audio signal from an imaging device, a microphone or the like and outputting a signal processed by signal processing unit 12 to an external monitor, speaker or the like. Signal input/output unit 11 may be configured as communication means that exchange a video signal and an audio signal with external equipment via a communication path.

Signal processing unit 12 has signal conversion units such as an encoder and a decoder, and also a buffer for temporarily storing data.

Storage unit 13 is provided for storing various setup information of apparatus body 10. Control unit 17 stores various setup information set by a user in storage unit 13 via bus 18. The setup information includes information whether or not contents should be encrypted and recorded.

Wireless communication unit 15 is an interface module for connecting the apparatus to the internet, and is configured by a wireless LAN module or the like. Wireless communication unit 15 is responsive to an instruction from control unit 17 to communicate with a management server managing authentication passwords, and inquire an authentication password based on a serial number of recording medium 20. If an authentication password corresponding to the serial number of recording medium 20 is obtained from the management server, the authentication password is stored in a memory of control unit 17.

Control unit 17 has a general arithmetic processor, a memory, a storage area storing programs for operating the arithmetic processor, and the like. Further, control unit 17 has onboard a file system for recording desired data in recording medium 20 as files.

The video signal and the audio signal inputted from signal input/output unit 11 are processed in signal processing unit 12 to be converted to encoded digital data. These digital data are stored in the buffer, and then recorded by control unit 17 as data files in recording medium 20 via interface unit 16. At this time, control unit 17 produces data of a first frame of the encoded digital data as thumbnail images, which are image files in a bitmap format, and records the data in recording medium 20. The thumbnail images can be displayed as a list of thumbnails on monitor 14 by a user operation. The thumbnail image data are prepared so that, for example, a desired image data can be easily found from recording medium 20. Accordingly, each image data is compressed to an image data of, for example, vertical 80 pixels by horizontal 60 pixels with each pixel being composed of 24 bits.

Further, control unit 17 produces clip management information used for managing and connecting such information as the frame rate, the number of frames, and the duration representing the data size by the number of frames, of the video signal and the audio signal, and produces XML format data files. The clip management information is also recorded in recording medium 20 by the file system.

Figure 2:
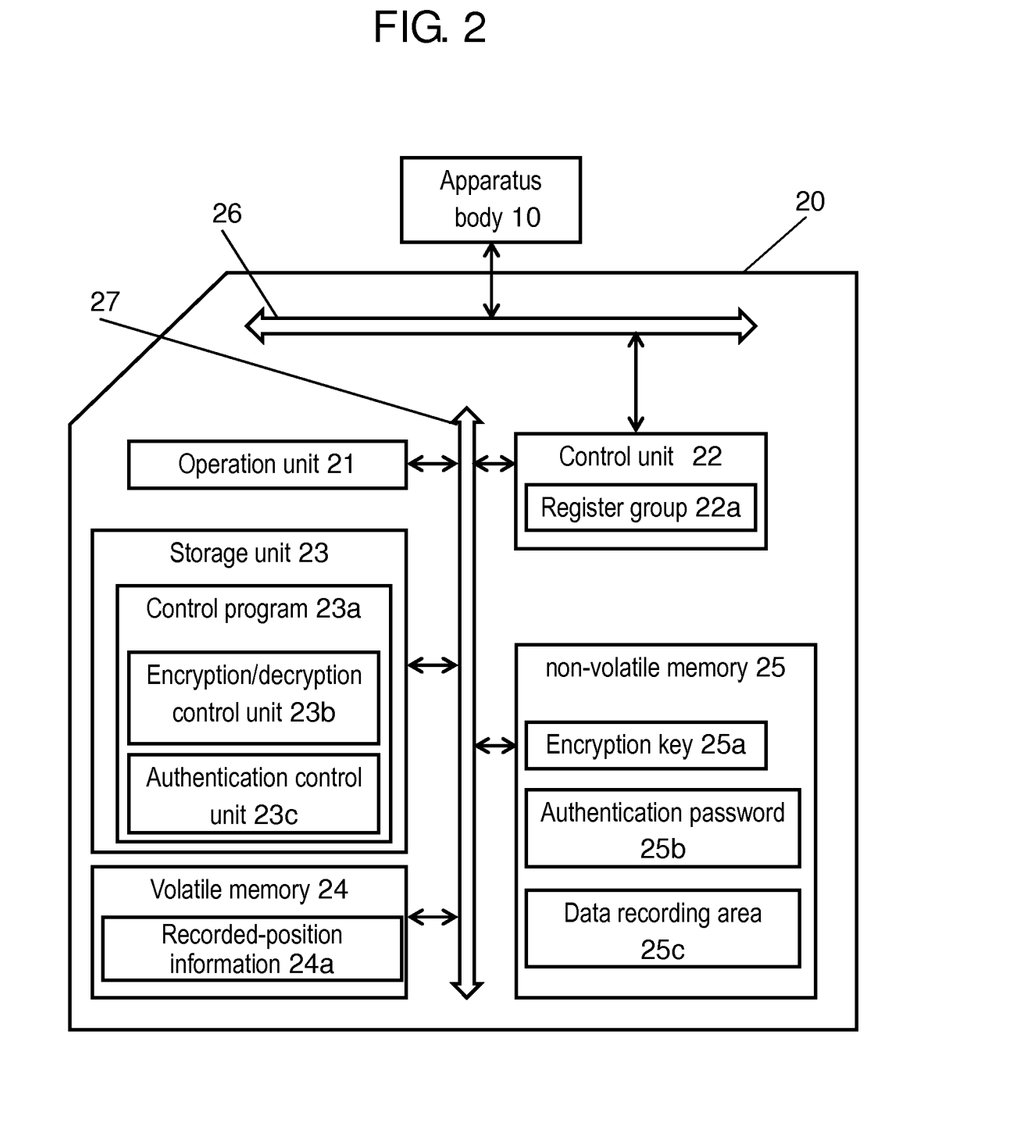
FIG. 2 is a block diagram showing a schematic configuration of a recording medium according to an embodiment of the present technique.

FIG. 2 is a block diagram showing a schematic configuration of a recording medium according to an embodiment of the present technique.

As shown in FIG. 2, recording medium 20 has operation unit 21, control unit 22, storage unit 23 composed of a ROM (Read Only Memory) as a non-volatile memory, volatile memory 24 composed of a RAM (Random Access Memory), non-volatile memory 25 composed of a flash memory, bus 26 for transmitting data between apparatus body 10 and control unit 22, and bus 27 connecting operation unit 21, control unit 22, storage unit 23, volatile memory 24 and non-volatile memory 25 to allow data transmission among them. With this configuration, operation unit 21 is accessibly connected to control unit 22 containing register group 22a, storage unit 23, volatile memory 24 and non-volatile memory 25 via bus 27. Further, once recording medium 20 is detached from apparatus body 10 and thus power supply is cut, data stored in volatile memory 24 are erased. However, data stored in storage unit 23 and non-volatile memory 25 are kept without being erased even after power supply is cut.

Operation unit 21 is connected to bus 27, and executes control program 23a stored as a firmware in storage unit 23 to perform control of control unit 22. Control program 23a stored in storage unit 23 includes therein encryption/decryption control unit 23b performing encryption and decryption of data transmitted from apparatus body 10, and authentication control unit 23c performing an authentication procedure for authenticating a password sent from apparatus body 10.

Control unit 22 has register group 22a, and receives a control command sent from apparatus body 10 via bus 26. Control unit 22 analyzes the received control command, and stores a command number, a command argument and the like in register group 22a. Operation unit 21 refers to the values stored in register group 22a, and executes control program 23a.

Volatile memory 24 is connected to bus 27, and functions as a work memory of operation unit 21, while storing various data necessary for the processes performed in recording medium 20. Volatile memory 24 also contains recorded-position information 24a for holding recorded position of data which have been encrypted and recorded under an unauthenticated condition. Here, the unauthenticated condition means a condition in which authentication control unit 23c does not perform any authentication procedure for authenticating a password. Further, when recording medium 20 is detached from apparatus body 10 and power supply is cut, data stored in volatile memory 24 are erased.

Non-volatile memory 25 is connected to bus 27, and has an area storing encryption key 25a to be used by encryption/decryption control unit 23b and authentication password 25b to be used for authentication by authentication control unit 23c, and data recording area 25c for recording data encrypted by encryption/decryption control unit 23b.

Encryption key 25a is produced at random by encryption/decryption control unit 23b when authentication password 25b is set by a control command sent from apparatus body 10. Encryption key 25a is used, when a write command is received from apparatus body 10, by encryption/decryption control unit 23b to encrypt data set in a specified address of register group 22a from apparatus body 10. Also, encryption key 25a is used, when a read command is received from apparatus body 10, as a decryption key by encryption/decryption control unit 23b to decrypt data read from data recording area 25c.

Authentication password 25b is set by an authentication password setting command sent from apparatus body 10. Authentication password 25b is used as a password for authentication by authentication control unit 23c when the authentication password setting command is received from apparatus body 10.

Authentication control unit 23c, when it has received the authentication password setting command from apparatus body 10, compares a password received as an argument of the authentication password setting command with authentication password 25b, and, in the case of coincidence, records a success of authentication in volatile memory 24. Specifically, authentication control unit 23c compares the received authentication password with authentication password 25b stored in non-volatile memory 25 to check whether or not they coincide with each other. If the received authentication password coincides with the stored authentication password 25b, or authentication succeeds, authentication control unit 23c writes an authentication flag "1" indicating an authenticated state into volatile memory 24.

On the other hand, if authentication does not succeed for the reason that any authentication password is not received from apparatus body 10, or authentication does not succeed for the reason that the received authentication password does not coincide with the stored authentication password 25b, authentication control unit 23c writes an authentication flag "0" indicating an unauthenticated state into volatile memory 24. In this way, the authentication flag indicating either the authenticated state or the unauthenticated state is stored in volatile memory 24 as a result of the authentication procedure by authentication control unit 23c. The authentication flag information indicating the authenticated or unauthenticated state in volatile memory 24 is set to be the unauthenticated state as an initial value at the power up time of recording medium 20, or the time when recording medium 20 is attached to apparatus body 10.

Data recording area 25c is an area for storing data from apparatus body 10 and reading out the stored data. When a write command is received from apparatus body 10, data set in a specified address of register group 22a from apparatus body 10 are recorded in data recording area 25c by control program 23a. At this time, when the write command is received from apparatus body 10, the data set in the specified address of register group 22a from apparatus body 10 are encrypted by encryption/decryption control unit 23b, and then recorded in data recording area 25c. Incidentally, in the case of the unauthenticated state, when the write command is received from apparatus body 10, and data are encrypted by encryption/decryption control unit 23b and recorded in data recording area 25c, recorded-position information 24a indicating the recorded position of the data is written into volatile memory 24. Information used as this recorded-position information 24a is file system management information of non-volatile memory 25.

Further, when a read command is received from apparatus body 10, data read from data recording area 25c are recorded in a specified address of register group 22a by control program 23a. At this time, when the read command is received from apparatus body 10, the data read from data recording area 25c are decrypted by encryption/decryption control unit 23b, and then recorded in register group 22a. Incidentally, in the case of the unauthenticated state, when the read command is received from apparatus body 10, recorded-position information 24a of non-volatile memory 24 is referred to, and data are read from the position in data recording area 25c contained in recorded-position information 24a.

Although encryption/decryption control unit 23b and authentication control unit 23c are realized by software in the present embodiment described above, they may be realized by hardware by preparing dedicated circuits.

Next, an operation of writing data transmitted from apparatus body 10 into a recording medium according to the present technique will be described.

Figure 3:
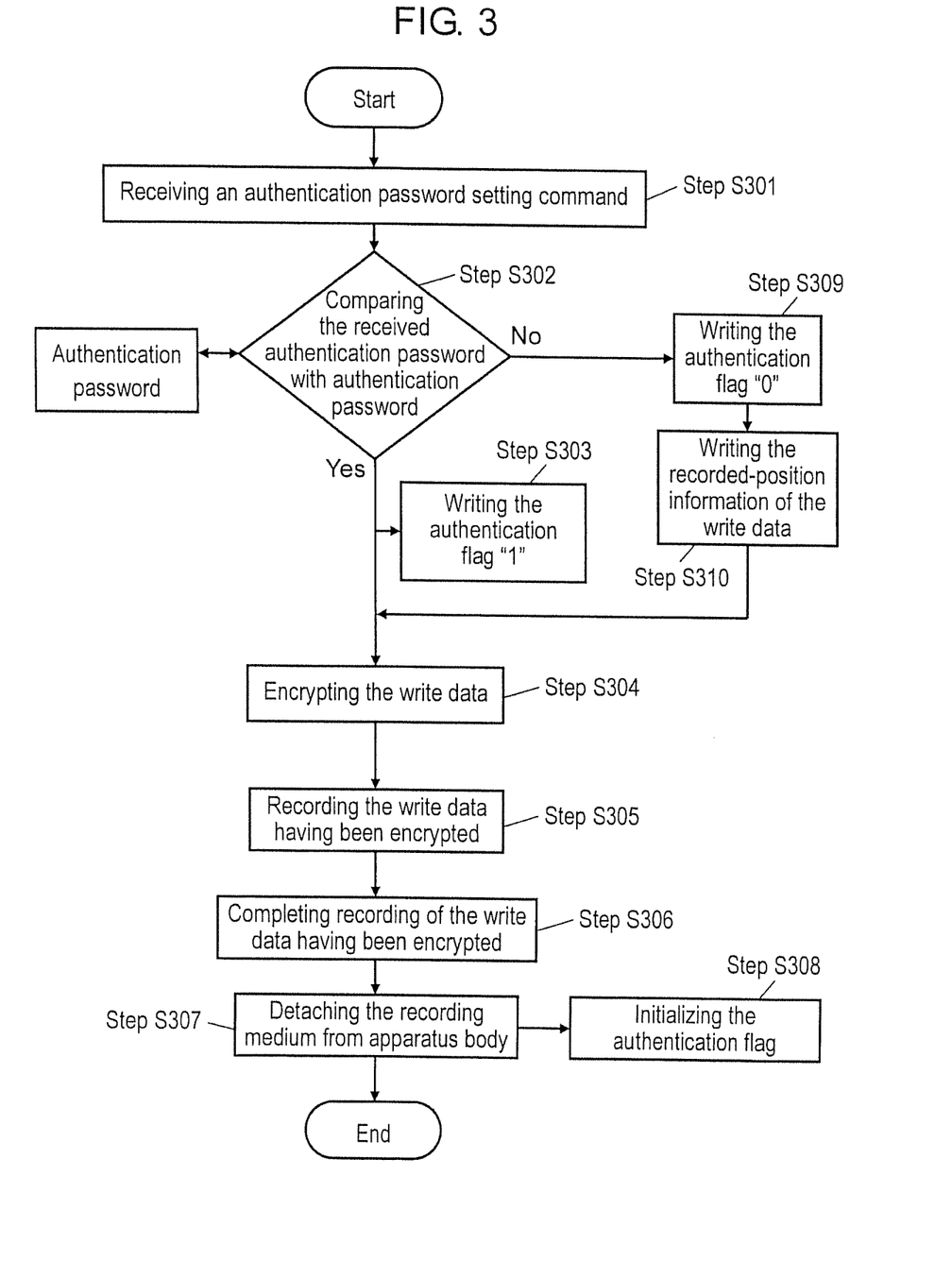
FIG. 3 is a flowchart showing an operation flow in a case that the recording medium according to the present technique receives an authentication password setting command during a write operation.

FIG. 3 is a flowchart showing an operation flow in a case that the recording medium according to the present technique receives an authentication password setting command during a write operation.

First, by inputting an authentication password from apparatus body 10, recording medium 20 receives an authentication password setting command at step S301.

Next, authentication control unit 23c compares the received authentication password with authentication password 25b stored in non-volatile memory 25 to check whether or not they coincide with each other at step S302. If the received authentication password coincides with the stored authentication password 25b, or authentication succeeds, authentication control unit 23c writes the authentication flag "1" indicating the authenticated state into volatile memory 24 at step S303. Incidentally, the authentication flag information indicating the authenticated or unauthenticated state in volatile memory 24 is set the unauthenticated state as an initial value at the power up time of recording medium 20, or the time when recording medium 20 is attached to apparatus body 10.

When the information stored in volatile memory 24 indicates the authenticated state, the write data sent from apparatus body 10 are encrypted at step S304. The operation of encrypting the write data is performed by encryption/decryption control unit 23b, which encrypts data set in a specified address of register group 22a from apparatus body 10 by using encryption key 25a when an encryption-recording command is received from apparatus body 10. Then, the write data having been encrypted are recorded in data recording area 25c of non-volatile memory 25 at step S305.

After completing recording of the write data in data recording area 25c of non-volatile memory 25 at step S306, if recording medium 20 is detached from apparatus body 10 at step S307, the authentication flag indicating the authenticated state stored in volatile memory 24 is initialized at step S308. This ends the write operation in the case that an authentication password setting command is received and authentication succeeds.

On the other hand, in a case that the received authentication password does not coincide with the stored authentication password 25b, or authentication is unsuccessful, at step S302, the authentication flag "0" is written into volatile memory 24 at step S309. Also, recorded-position information 24a of the unauthenticated write data is written into volatile memory 24 at step S310.

In the following steps, similarly to the authenticated case, the write data sent from apparatus body 10 are encrypted at step S304, and the encrypted write data are recorded in data recording area 25c of non-volatile memory 25 at step S305. When recording of the write data in data recording area 25c of non-volatile memory 25 is completed at step S306, and recording medium 20 is detached from apparatus body 10 at step S307, the authentication flag stored in volatile memory 24 is initialized at step S308, and data of recorded-position information 24a of the unauthenticated write data is also erased. This ends the write operation in the case that an authentication password setting command is received and authentication does not succeed.

In the write operation when an authentication password setting command is received, as described above, the write data are recorded regardless of whether authentication succeeds or not. However, in the case that authentication did not succeed, recorded-position information 24a of the write data is erased by detaching recording medium 20 from apparatus body 10, and consequently it becomes difficult to read out the write data recorded in data recording area 25c of non-volatile memory 25.

Figure 4:
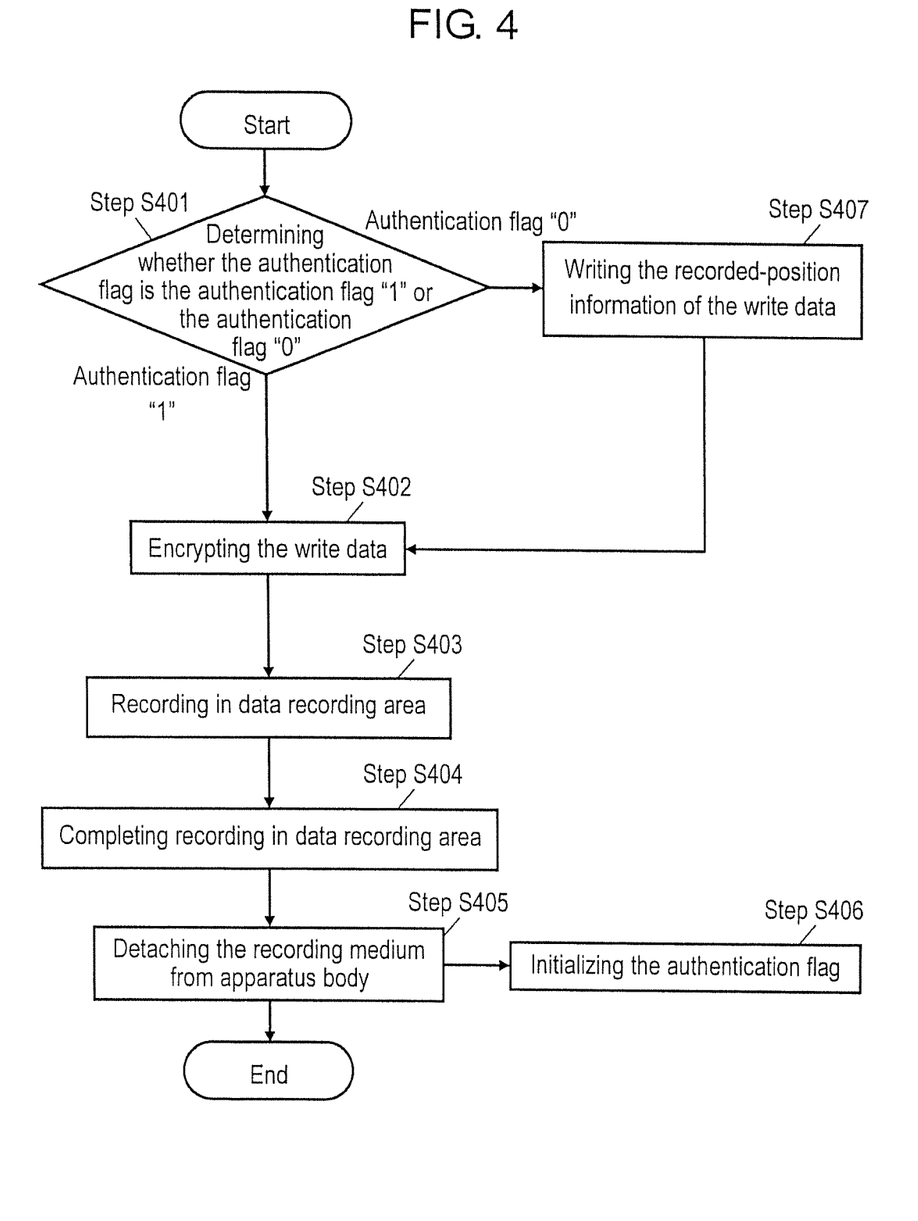
FIG. 4 is a flowchart showing an operation flow in a case that the recording medium according to the present technique does not receive an authentication password setting command during a write operation.

FIG. 4 is a flowchart showing an operation flow in a case that an authentication password setting command is not received during a write operation.

In this case, in which no authentication password is inputted from apparatus body 10, it is determined at step S401 whether the authentication flag stored in volatile memory 24 is the authentication flag "1" indicating the authenticated state or the authentication flag "0".

If the information stored in volatile memory 24 is the one indicating the authenticated state, the write data sent from apparatus body 10 are encrypted at step S402. The operation of encrypting the write data is performed by encryption/decryption control unit 23b, which encrypts data set in a specified address of register group 22a from apparatus body 10 by using encryption key 25a when an encryption-recording command is received from apparatus body 10. Then, the write data having been encrypted are recorded in data recording area 25c of non-volatile memory 25 at step S403.

After completing recording of the write data in data recording area 25c of non-volatile memory 25 at step S404, if recording medium 20 is detached from apparatus body 10 at step S405, the authentication flag indicating the authenticated state stored in volatile memory 24 is initialized at step S406. This ends the write operation in the case that an authentication password setting command is not received and the information stored in volatile memory 24 is the authentication flag "1".

On the other hand, if the information stored in volatile memory 24 is the authentication flag "0" at step S401, recorded-position information 24a of the unauthenticated write data is written into volatile memory 24 at step S407.

In the following steps, similarly to the case of the authenticated state, the write data sent from apparatus body 10 are encrypted at step S402, and the encrypted write data are recorded in data recording area 25c of non-volatile memory 25 at step S403. When recording of the write data in data recording area 25c of non-volatile memory 25 is completed at step S404 and recording medium 20 is detached from apparatus body 10 at step S405, the authentication flag stored in volatile memory 24 is initialized at step S406, and data of recorded-position information 24a of the unauthenticated write data is also erased. This ends the write operation in the case of the unauthenticated state.

In the write operation when the authentication password setting command is not received, as described above, the write data are recorded regardless of whether recording medium 20 is in the authenticated state or the unauthenticated state. However, in the case of the unauthenticated state, since recorded-position information 24a of the write data is erased by detaching recording medium 20 from apparatus body 10, it becomes difficult to read out the write data recorded in data recording area 25c of non-volatile memory 25.

Next, an operation of reading out data recorded in a recording medium according to the present technique will be described.

Figure 5:
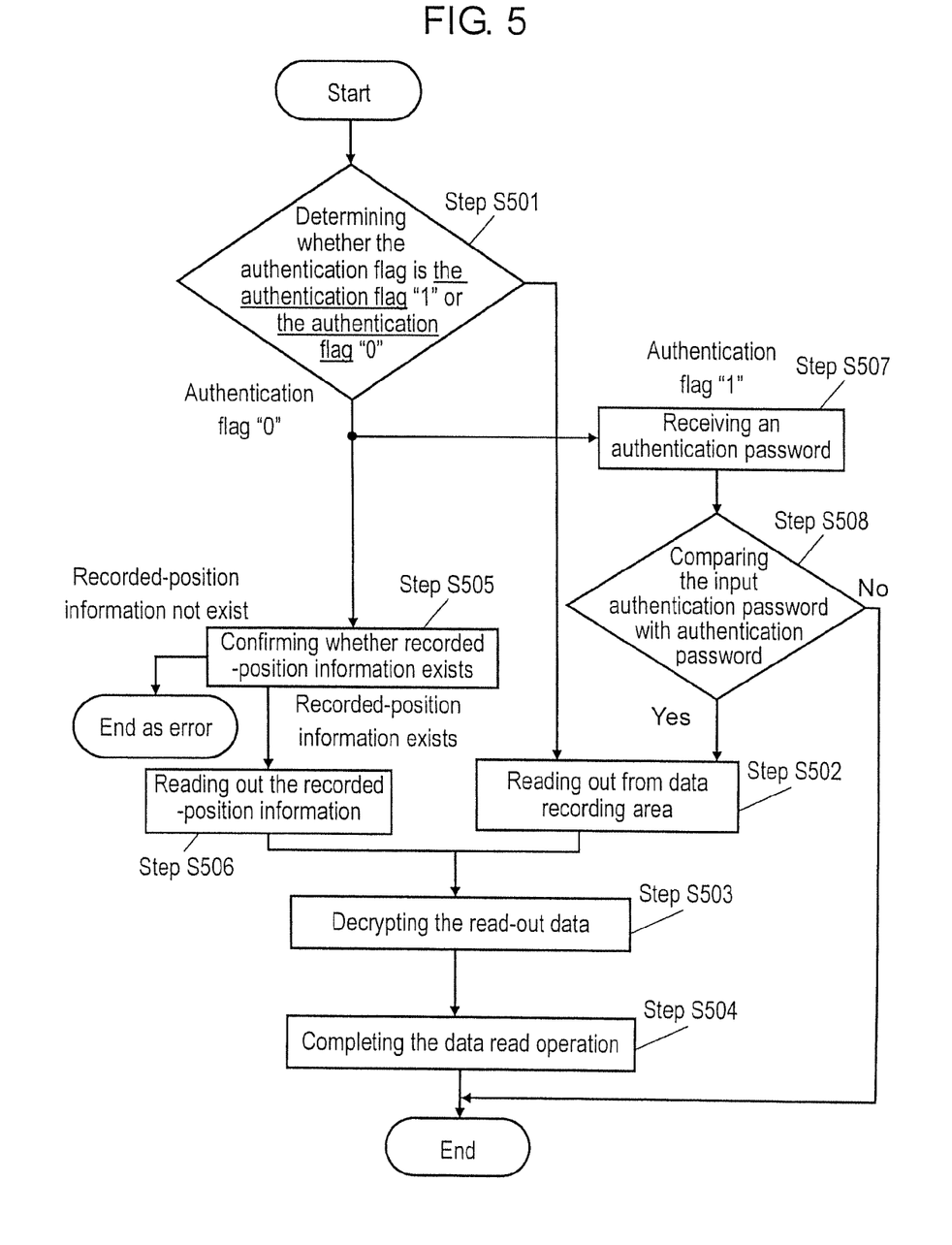
FIG. 5 is a flowchart showing an operation flow during a read operation of the recording medium according to the present technique.

FIG. 5 is a flowchart showing an operation flow during a read operation.

When a read command is inputted from apparatus body 10, control program 23a first refers to the status of volatile memory 24. In other words, it is determined whether the authentication flag stored in volatile memory 24 is the authentication flag "1" indicating the authenticated state or the authentication flag "0" at step S501.

In the case that the information stored in volatile memory 24 is the one indicating the authenticated state, in which data read-out is possible, data are read out from data recording area 25c of non-volatile memory 25 at step S502, and the read-out data are decrypted at step S503 to complete the data read operation at step S504. Decryption of data is executed at step S503 by encryption/decryption control unit 23b of storage unit 23 by using encryption key 25a as a decryption key. The decrypted data are recorded in a specified address of register group 22a by control program 23a to be in a state transmissible to apparatus body 10.

In the case that the information stored in volatile memory 24 is the authentication flag "0", or in the unauthenticated case, the process proceeds to step S505 to confirm whether recorded-position information 24a exists in volatile memory 24 or not. If recorded-position information 24a exists at step S505, an operation of reading out recorded-position information 24a is executed at next step S506. In the following steps, similarly to the case of the authenticated state, operations of reading out data from data recording area 25c of non-volatile memory 25 based on recorded-position information 24a at step S502 and decrypting the read-out data at step S503 are performed to complete the data read operation at step S504. If recorded-position information 24a does not exist at step S505, the process ends as an error.

Here, the confirmation whether recorded-position information 24a exists or not is made by control program 23a by referring to, in recorded-position information 24a, a value of a bit corresponding to a sector of a read address set as an argument of a read command from apparatus body 10. If the corresponding bit is "1", it is determined that the recorded-position information exists, and the process proceeds to step S506. If the corresponding bit is "0", it is determined that the recorded-position information does not exist. In this case, a register for notifying an error is set in register group 22a to notify the error to apparatus body 10, and the process ends.

Further, even in the case that the information stored in volatile memory 24 is the authentication flag "0", since it is possible to read out data which were written in a write operation under such a condition that an authentication password setting command had been received and authentication had succeeded, the process proceeds to step S507 to check the authentication password.

In step S507, an authentication password is received from apparatus body 10 in the same manner as in the write operation. Then, it is determined whether the input authentication password coincides with authentication password 25b stored in non-volatile memory 25 at step S508. If the input authentication password coincides with authentication password 25b, operations of reading out data at step S502 and decrypting the read-out data at step S503 are performed, in the same way as in the case of the authenticated state, to complete the data read operation at step S504. If the input authentication password does not coincide with authentication password 25b, the process ends without performing the data read operation.

In the read operation, as described above, even in the case that the authentication flag stored in volatile memory 24 is checked whether it indicates the authenticated state or not and determined to be the unauthenticated state, it is possible to read out data written in data recording area 25c of non-volatile memory 25 if recorded-position information 24a exists in volatile memory 24. Even in the unauthenticated state, it is of course possible, if the input authentication password coincides with authentication password 25b, to read out data written in the write operation under condition of successful authentication.

As described above, a recording medium according to the present technique has non-volatile memory 25 for recording encrypted data, and volatile memory 24 for storing an authentication flag indicating whether an authentication by an authentication password has been completed or not, and recorded-position information 24a of data recorded in non-volatile memory 25 when the authentication flag indicates an unauthenticated state. With this configuration, even in the case that any authentication password has not been obtained, it is possible to encrypt and record data in non-volatile memory 25 by storing recorded-position information 24a in volatile memory 24, as well as to decrypt and read out the encrypted data by referring to recorded-position information 24a in volatile memory 24. Accordingly, if recording medium 20 is in the condition kept attached to apparatus body 10, it is possible without the password authentication to perform the operation of writing data transmitted from apparatus body 10 and the operation of reading out the written data.

Further, by detaching recording medium 20 from apparatus body 10, the authentication flag stored in volatile memory 24 is initialized, and recorded-position information 24a is also erased. Therefore, since an operation of reading out data recorded in non-volatile memory 25 of recording medium 20 cannot be performed under the condition that no authentication password is obtained, it is possible to let recording medium 20 have a security function based on an authentication password.

A recording medium used in a business-use photographing apparatus, which is used for news reporting or the like, is required to provide both an instantaneous operation enabling quick start of shooting after power-on and an operation securing confidentiality of recorded data. A recording medium according to the present technique is able to perform an operation of immediately writing shot data and an operation of reading out the written data at the stage when it is attached to apparatus body 10, or power supply is started, and thus has an instantaneous operation capability. In addition, since it is made impossible to read out data which have been recorded without an authentication based on an authentication password by stopping supply of power by detaching the recording medium from apparatus body 10, it is possible to secure confidentiality of the recorded information.

In the above, an embodiment has been described as an example of the technique according to the present disclosure. The detailed description and accompanying drawings have been provided for that purpose. Accordingly, components shown in the accompanying drawings and described in the detailed description include not only components which are essential to solve the problems, but also components which are not essential to solve the problems, but are used for exemplifying the above-mentioned technique. Therefore, those non-essential components should not be immediately construed as essential for the reason that the non-essential components are shown in the accompanying drawings or described in the detailed description.

Also, since the above-described embodiment is to exemplify the technique according to the present disclosure, various modifications, substitutions, additions or omissions may be possible within the scope of the claims or equivalents thereof.

What is claimed is:

1. A recording medium which is attachable to and detachable from an apparatus body, and is supplied with power from the apparatus body when it is attached to the apparatus body, the recording medium comprising:
   an encryption/decryption control unit that performs encryption and decryption of data transmitted from the apparatus body;
   an authentication control unit that performs an authentication procedure for authenticating a password sent from the apparatus body;
   a non-volatile memory that stores an encryption key to be used in the encryption/decryption control unit and an authentication password to be used in the authentication control unit for authenticating the password sent from the apparatus body,
the non-volatile memory has a data recording area for recording data encrypted by the encryption/decryption control unit; and
   a volatile memory for storing recorded-position information of the data recorded in the data recording area of the non-volatile memory,
   wherein the volatile memory stores the recorded-position information only under an unauthenticated state in which the authentication procedure by the authentication control unit has not been performed,
   wherein, in an authenticated state in which the authentication procedure by the authentication control unit has been successfully performed, the data recorded in the data recording area under both the authenticated state and the unauthenticated state is read out,
   wherein, in the unauthenticated state, only the data recorded in the data recording area under the unauthenticated state is read out, the data being read out using the recorded-position information stored in the volatile memory, and
   wherein the recorded-position information stored in the volatile memory is erased by stopping the power supply by detaching the recording medium from the apparatus body, and the recorded-position information is no longer available in the volatile memory even if the power is supplied again to the recording medium, so that, in the unauthenticated state, the data recorded in the data recording area under the unauthenticated state is not read out.

2. The recording medium according to claim 1, wherein an authentication flag indicating either the authenticated state or the unauthenticated state is stored in the volatile memory.

3. The recording medium according to claim 1, wherein an authentication flag indicating either the authenticated state or the unauthenticated state and the recorded-position information of the data recorded in the data recording area of the non-volatile memory under the unauthenticated state are stored in the volatile memory, and
   wherein, in a case that the authentication flag indicates the unauthenticated state, the data recorded in the data recording area of the non-volatile memory under the unauthenticated state is read out based on the recorded-position information.

* * * * *